United States Patent
Yoshida

(10) Patent No.: US 6,895,656 B2
(45) Date of Patent: May 24, 2005

(54) ASSEMBLY METHOD FOR DISK RECORDING APPARATUS

(75) Inventor: Kazuhiro Yoshida, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 435 days.

(21) Appl. No.: 10/210,070

(22) Filed: Aug. 2, 2002

(65) Prior Publication Data

US 2003/0061707 A1 Apr. 3, 2003

(30) Foreign Application Priority Data

Oct. 3, 2001 (JP) .......................................... 2001-307599

(51) Int. Cl.$^7$ .......................... G11B 5/127; H04R 31/00
(52) U.S. Cl. ............................... 29/603.03; 29/603.09; 73/658; 324/207.23
(58) Field of Search ..................... 29/596, 598, 603.03, 29/603.09, 603.1; 73/579, 658–660; 324/207.23, 207.25; 360/75

(56) References Cited

U.S. PATENT DOCUMENTS

| | | | |
|---|---|---|---|
| 6,128,153 A | | 10/2000 | Hasegawa et al. |
| 6,158,112 A | * | 12/2000 | Kim et al. .................... 29/759 |
| 6,189,371 B1 | * | 2/2001 | Hirano .......................... 73/66 |
| 6,453,541 B1 | * | 9/2002 | Guthrie et al. ........... 29/603.03 |
| 6,684,707 B2 | * | 2/2004 | Hagiwara .................... 73/660 |

FOREIGN PATENT DOCUMENTS

| | | |
|---|---|---|
| EP | 0 938 087 A1 | 8/1999 |
| JP | 63-863 | 1/1988 |
| JP | 4-209361 | 7/1992 |
| JP | 6-342578 | 12/1994 |
| JP | 6-302099 | 10/1995 |
| JP | 10-199127 | 7/1998 |
| JP | 2000-268533 | 9/2000 |

OTHER PUBLICATIONS

Patent Abstracts of Japan (CD–ROM), JP 2000268533 A, Sep. 29, 2000.

* cited by examiner

*Primary Examiner*—A. Dexter Tugbang
*Assistant Examiner*—Donghai D. Nguyen
(74) *Attorney, Agent, or Firm*—Pillsbury Winthrop, LLP

(57) ABSTRACT

In an assembly method for a disk recording apparatus, a spindle motor is driven to rotate disks and with the disk recording apparatus supported by a linear guide mechanism for movement with one degree of freedom of translation in a direction substantially in parallel to surfaces of the disks. A measuring mechanism is used to measure vibration in the direction of the one degree of freedom of translation caused by the rotation of a rotating part of the disk recording apparatus. An angular position detecting mechanism is used to detect the angular position of each disk at which vibration of a maximum amplitude is generated. The eccentricity and the direction of eccentricity of the rotating part are analyzed in accordance with the measured vibration and the detected angular position, and the base and the rotating part are moved relatively to correct the eccentricity in accordance with the result of the analysis.

4 Claims, 7 Drawing Sheets

ASSEMBLY METHOD FOR DISK RECORDING APPARATUS

CROSS-REFERENCE TO RELATED APPLICATIONS

This application is based upon and claims the benefit of priority from the prior Japanese Patent Application No. 2001-307599, filed Oct. 3, 2001, the entire contents of which are incorporated herein by reference.

BACKGROUND OF THE INVENTION

1. Field of the Invention

The present invention relates to a method of assembling a disk recording apparatus and an assembling apparatus for the same.

2. Description of the Related Art

A wide variety of modern computers, such as personal computers, desktop computers, notebook-type computers, etc., use disk recording apparatuses as memories for storing a great deal of information.

A disk recording apparatus, e.g., a magnetic disk drive, generally comprises a plurality of magnetic disks arranged in layers, magnetic head assemblies, and a head actuator. Each of the magnetic head assembly includes a magnetic head for recording on and reproducing information from the magnetic disk. The head actuator supports the magnetic head assemblies for movement relative to the magnetic disks and serves to move them to desired tracks on the disks.

The magnetic disks are fitted on the cylindrical hub of a spindle motor and are supported coaxially with one another and in spaced layers. The magnetic disks are rotated at a given speed by driving the spindle motor. The spindle motor, head actuator, etc., are mounted on a base.

The spindle motor has the hub that serves as a rotor, and a flange is formed on one end side of the hub. The magnetic disks are fitted on the hub and sandwiched between the flange of the hub and a damper that is screwed to the upper end of the hub.

Since a rotating part that includes the hub of the spindle motor, clamper, and magnetic disks rotates at high speed, its center of gravity must be coincident with the center of rotation. If the center of gravity of the rotating part and the center of rotation are not coincident, vibration is caused during the rotation, so that the data write/read accuracy for the magnetic disks inevitably drops.

In a notebook-type computer, moreover, a magnetic disk drive is often located under a keyboard or palm rest, so that the vibration of the disk drive may be transmitted directly to a user's body in some cases.

Usually, the non-coincidence of the center of gravity of the rotating part and the center of rotation is removed during the assembly of the magnetic disk drive. Described in Jpn. Pat. Appln. KOKAI Publication No. 6-342578, for example, is an assembly method for a magnetic disk drive in which a weight for adjustment is placed on a damper for magnetic disks. In this case, however, the eccentricity is measured by means of a measuring device separate from the adjusting device.

Further, a correcting mechanism for dislocation of disks is described in Jpn. Pat. Appln. KOKAI Publication No. 6-302099. In this correcting mechanism, servo position information that is written on a recording medium is used for the measurement of eccentricity, and the disks themselves are moved to adjust the eccentricity.

Described in Jpn. Pat. Appln. KOKAI Publication No. 2000-268533, furthermore, is a method in which each disk is moved and centered by means of four actuators.

However, the conventional methods of assembly and adjustment described above require independent adjusting and measuring devices or a large number of actuators, so that the adjusting operation is troublesome, and the whole equipment is inevitably large-scaled.

BRIEF SUMMARY OF THE INVENTION

The present invention has been contrived in consideration of these circumstances, and its object is to provide an assembly method and an assembly apparatus for a disk recording apparatus, capable of easily adjusting eccentricity of a rotating part.

In order to achieve the above object, a method of assembling a disk recording apparatus according to an aspect of the invention is provided as an assembly method for a disk recording apparatus, which comprises a base, a spindle motor fixed to the base, a disk mounted on a rotor of the spindle motor, and a damper fastening the disk to the rotor, the method comprising: driving the spindle motor to rotate a rotating part, including the rotor, disk, and clamper, in a manner such that the disk recording apparatus is supported for movement with one degree of freedom of translation in a direction substantially in parallel to surfaces of the disk; measuring vibration of the disk recording apparatus in the direction of the one degree of freedom of translation caused by the rotation of the rotating part; detecting the angular position of the disk at which vibration of a maximum amplitude is generated; analyzing the eccentricity and the direction of eccentricity of the rotating part in accordance with the measured vibration and the detected angular position; and relatively moving the base and the rotating part to correct the eccentricity in accordance with the result of the analysis.

Further, an assembly apparatus for a disk recording apparatus according to another aspect of the invention is an assembly apparatus for a disk recording apparatus, which comprises a base, a spindle motor fixed to the base, a disk mounted on a rotor of the spindle motor, and a damper fastening the disk to the rotor, the assembly apparatus comprising: a linear guide mechanism configured to support the disk recording apparatus for movement with one degree of freedom of translation in the surface direction of the disk; a measuring mechanism configured to measure vibration of the disk recording apparatus in the direction of the one degree of freedom of translation caused when the spindle motor of the disk recording apparatus supported by the linear guide mechanism is driven to rotate a rotating part, including the rotor, disk, and clamper; an angular position detecting mechanism configured to detect the angular position of the disk at which vibration of a maximum amplitude is generated; an analysis element configured to analyze the eccentricity and the direction of eccentricity of the rotating part in accordance with the measured vibration and the detected angular position; and a relative movement mechanism configured to relatively moving the base and the rotating part to correct the eccentricity in accordance with the result of the analysis by the analysis element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

An assembly method and an assembly apparatus for a disk recording apparatus according to an embodiment of the present invention will now be described in detail with reference to the accompanying drawings.

Figure 1A:
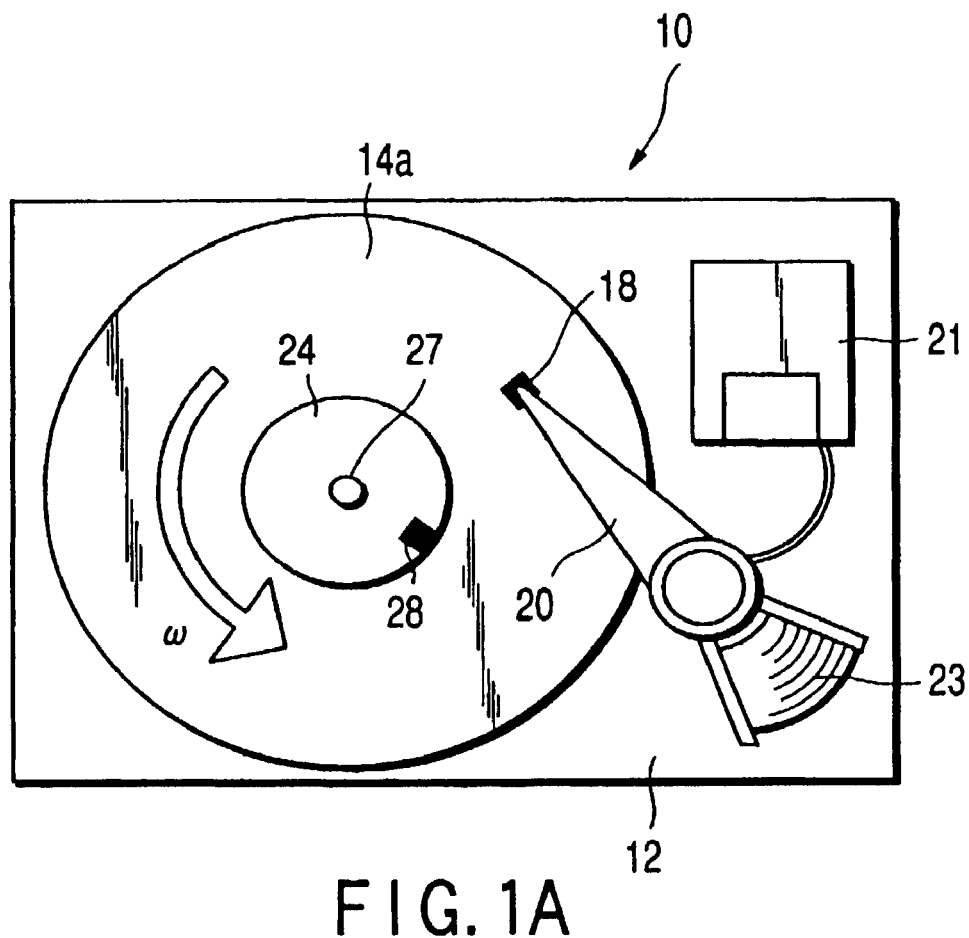
FIG. 1A is a plan view schematically showing a hard disk drive as an object of assembly by means of an assembly apparatus and an assembly method according to an embodiment of the invention.
Figure 1B:
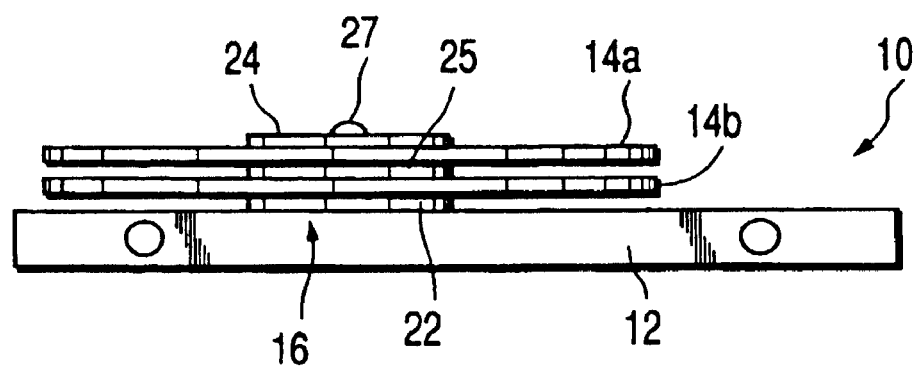
FIG. 1B is a side view of the hard disk drive.

The following is a description of a hard disk drive (hereinafter referred to as an HDD) for use as a disk recording apparatus to which the assembly method and the assembly apparatus are applied. As shown in FIGS. 1A and 1B, the HDD 10 comprises a case body 12 in the form of a rectangular plate that serves as a base.

Mounted on the case body 12 are two magnetic disks 14a and 14b for use as recording media, a spindle motor 16 for supporting and rotating these magnetic disks, and magnetic heads 18 for recording on and reproducing information from the magnetic disks, a head actuator 20, and a board unit 21 having a preamplifier or the like. The head actuator 20 supports the magnetic head for rotation and can be moved to a desired position relative to the magnetic disks. The head actuator 20 includes a voice coil motor 23.

The spindle motor 16 is provided with a stator (not shown) fixed to the case body 12 and a rotatable cylindrical hub 22 that serves as a rotor. The magnetic disks 14a and 14b are mounted on the hub 22 and held between a flange of the hub and a disk-shaped damper 24 that is fastened to the upper end of the hub by means of a screw 27. A spacer ring 25, which is fitted on the hub 22, is sandwiched between the two magnetic disks 14a and 14b. A reference mark 28 is formed on the damper 24.

Figure 2:
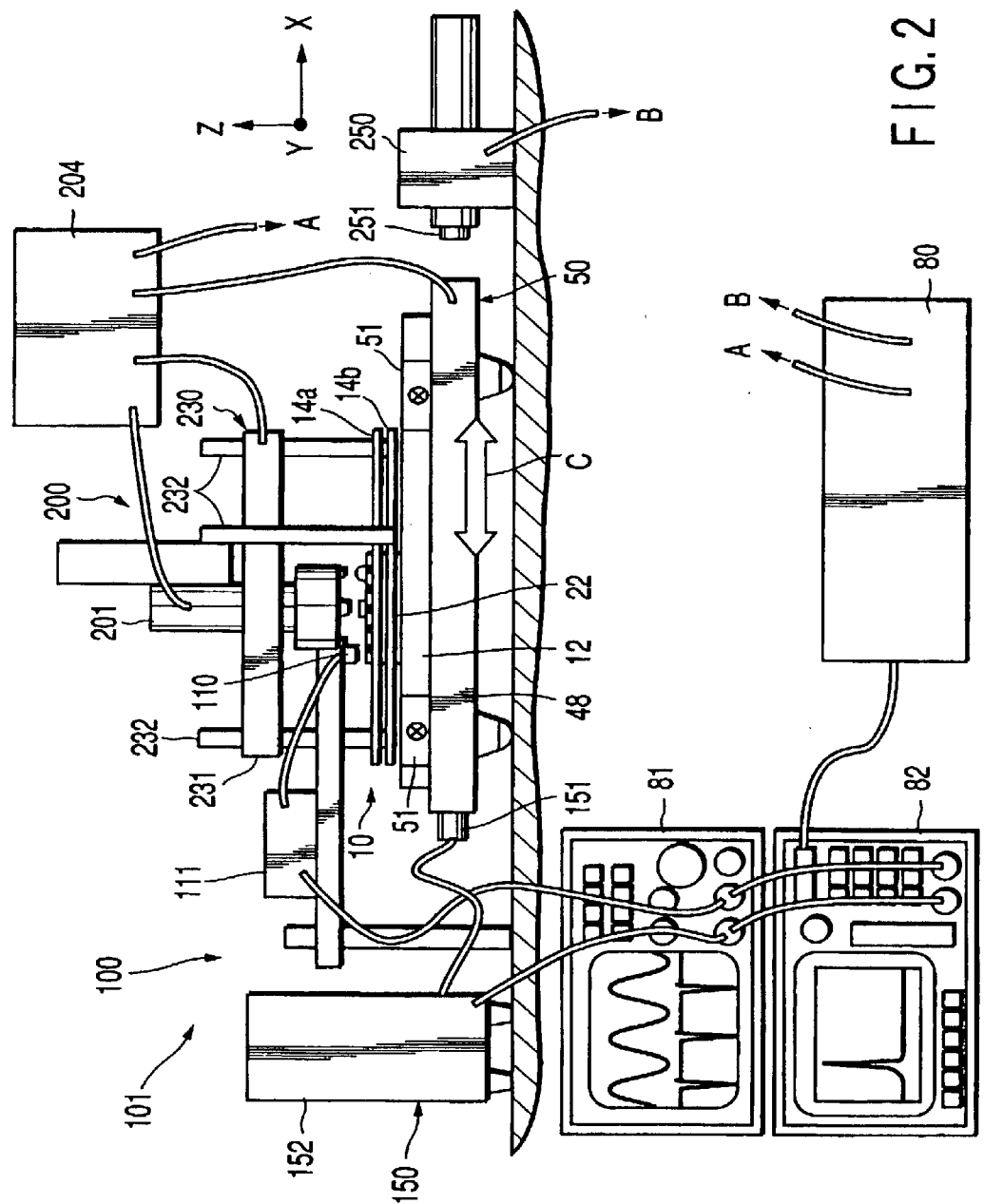
FIG. 2 is a view typically showing an outline of the assembly apparatus.

As shown in FIG. 2, the assembly apparatus comprises a measuring mechanism 100 for measuring the eccentricity of a rotating part of the HDD 10, a relative movement mechanism 200 for relatively moving the magnetic disks 14a and 14b and the case body 12 to adjust the eccentricity, and a control element 80 for controlling these mechanisms.

The measuring mechanism 100 comprises a linear guide mechanism 50, an angular position detecting mechanism 101 for detecting the rotational angle of each magnetic disk, and a vibration amplitude detecting mechanism 150 for detecting the vibration amplitude. The linear guide mechanism 50 has one degree of freedom of translation in the horizontal direction indicated by arrow C, for example. The linear guide mechanism 50 constitutes a common component for the relative movement mechanism 200.

The linear guide mechanism 50 has a rectangular stage 48 that can be translated in the direction of arrow C on a floor surface. The HDD 10 is fixedly mounted on the stage 48 by fixing jigs 51. The HDD 10 fixed on the stage 48 is movable together with the stage 48 in the surface direction of the magnetic disks 14a and 14b, i.e., in the direction in parallel to the surfaces of the magnetic disks.

The angular position detecting mechanism 101 comprises a photoreflector sensor 110 as a first sensor for detecting the reference mark 28 and a driver 111 for driving the same. The sensor 110 is located over the damper 24 of the HDD 10 that is mounted on the stage 48. The driver 111 is connected to the control element 80 through an oscilloscope 81 and a fast Fourier transformer (hereinafter referred to as FFT) analyzer 82.

The vibration amplitude detecting mechanism 150 comprises an acceleration pickup 151 that is attached to one end of the stage 48 with respect to its moving direction. The acceleration pickup 151, which serves as a second sensor, is connected to the control element 80 through an amplifier 152, the oscilloscope 81, and the FFT analyzer 82. The control element 80 controls the respective operations of the mechanisms, and serves as an analysis element of the present invention.

Further, the relative movement mechanism 200 includes a holding mechanism 230, fastening mechanism 201, feed mechanism 250, and contact sensor 251. The holding mechanism 230 can simultaneously hold the two magnetic disks 14a and 14b. The fastening mechanism 201 serves to tighten and loosen the screw 27 of the damper 24. The feed mechanism 250 can move the stage 48, having the HDD 10 thereon, in its moving direction. The contact sensor 251 is used to detect contact between the feed mechanism and the stage 48. The holding mechanism 230, fastening mechanism 201, and stage 48 are connected to the control element 80 through a driver 204. Likewise, the feed mechanism 250 and the contact sensor 251 are connected to the control element 80.

Figure 3:
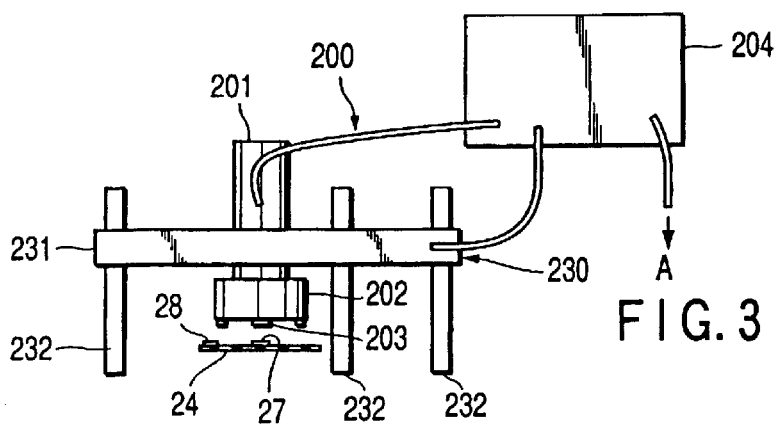
FIG. 3 is a side view showing a holding mechanism of the assembly apparatus.
Figure 4:
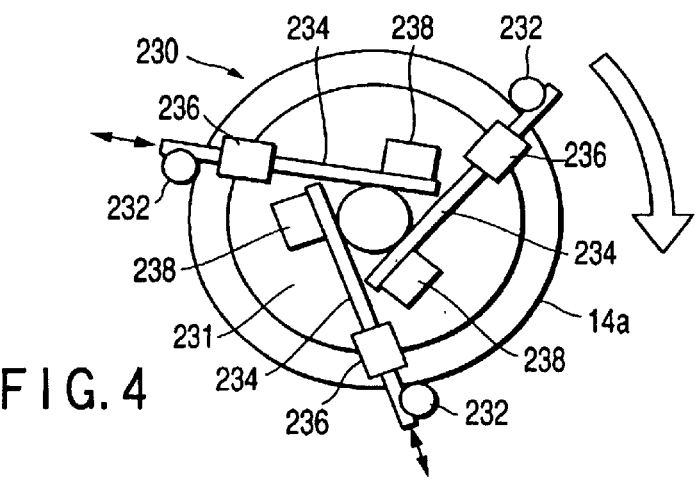
FIG. 4 is a plan view of the holding mechanism.

As shown in FIGS. 3 and 4, the holding mechanism 230 includes a disk-shaped support frame 231 that extends in the horizontal direction and three holding rods 232 that extend in a direction parallel to the axis of rotation of the disks or the vertical direction. The holding rods 232 are arranged at equal spaces of, e.g., 120 degrees on the circumference of a circle. Each holding rod 232 is fixed to a horizontally extending support rod 234, which is supported for reciprocation in its axial direction by means of a guide 236 that is mounted on the support frame 231. The holding rods 232 may be more than three in number.

Further, the proximal end portion of each holding rod 232 is connected to a movement mechanism 238 that is provided on the support frame 231. As the support rods 234 are reciprocated by means of the movement mechanisms 238, therefore, the holding rods 232 move in the radial direction to be pressed against the respective outer peripheral edges of the two magnetic disks 14a and 14b. Thus, the disks can be simultaneously held or released by means of the three holding rods 232. Alternatively, the holding mechanism 230 may be designed to be rotatable around its center so that it can hold each magnetic disk on the same spots on each occasion.

Figure 5A:
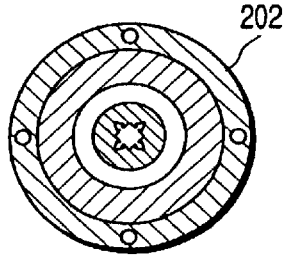
FIG. 5A is a front view of a fastening mechanism of the assembly apparatus.
Figure 5B:
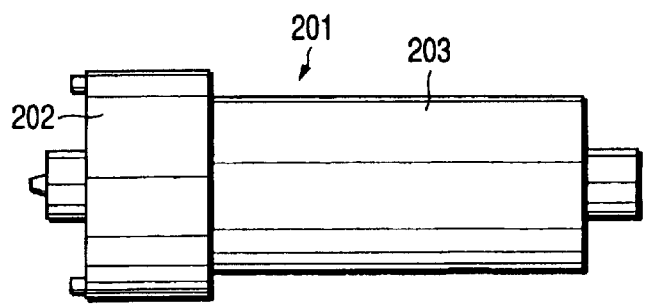
FIG. 5B is a side view of the fastening mechanism.

As shown in FIGS. 3, 5A and 5B, the fastening mechanism 201 is provided with a pin face wrench 202 and a stepping motor 203 for rotating the same. It is mounted on the central portion of the support frame 231 of the holding mechanism 230. The wrench 202 is opposed to the damper 24 of the HDD 10 fixed on the stage 48 so that it can tighten and loosen the screw 27 with the damper held in place.

The following is a description of the method for assembling the HDD 10 by means of the assembly apparatus constructed in this manner, especially, the way of adjusting the eccentricity between the center of gravity and the center of rotation. This adjustment is based on two methods, an eccentricity measuring method and an eccentricity correcting method, which will be described below.

Figure 6:
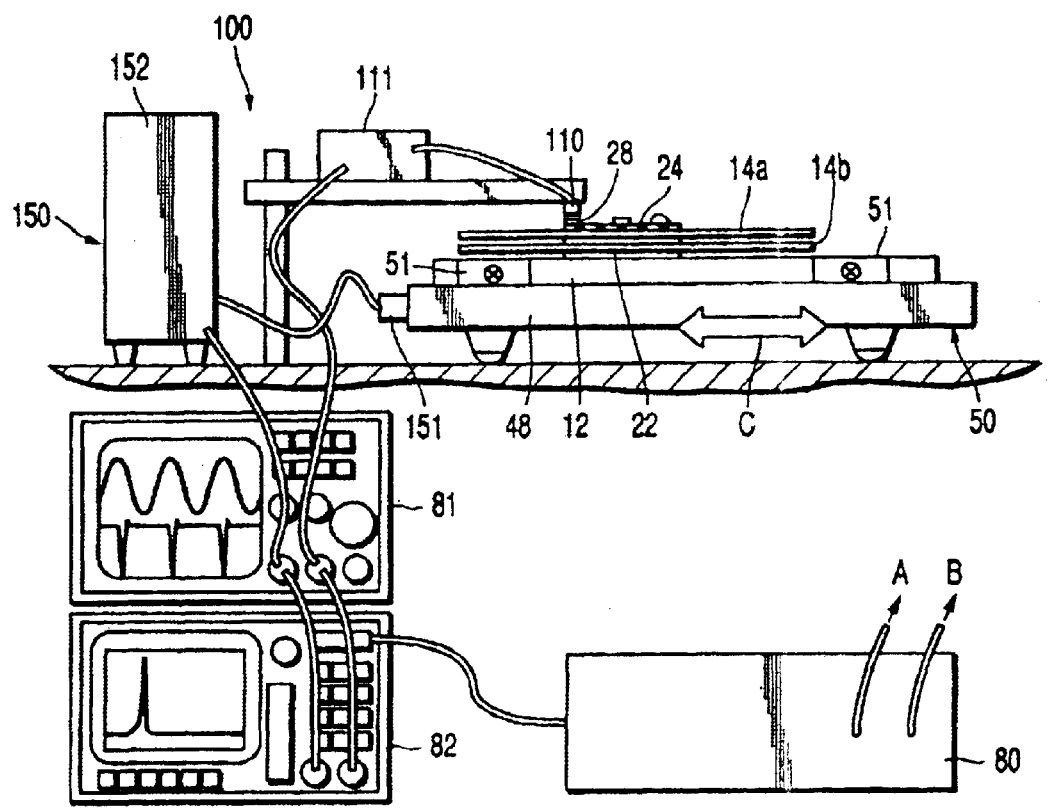
FIG. 6 is a view showing an eccentricity measuring process using the assembly apparatus.

The eccentricity measuring method will be described first. As shown in FIG. 6, the HDD 10 is mounted on the stage 48 of the linear guide mechanism 50 by means of the fixing jigs 51. In this state, the rotating part of the HDD 10, which includes the magnetic disks 14a and 14b, damper 24, and hub 22, is rotated by the spindle motor 16 of the HDD itself.

If the center of gravity of the rotating part and the center of rotation are eccentric with respect to each other, the linear guide mechanism 50 vibrates with an acceleration $\alpha$, urged by the whirling center of gravity. In this case, $\alpha$ is given by $$\alpha = (me\omega^2/M)\cos(\omega t+\phi) = \alpha_0 \cos(\omega t+\phi),$$

$$\alpha_0 = me\omega^2/M, \quad (1)$$

where $e$ is the eccentricity, $m$ is the mass of the rotating part, M is the total mass of the parts that are moved by means of the linear guide mechanism 50, that is, the stage 48, HDD 10, etc., $\omega$ is the angular velocity, and $\phi$ is settled depending on the way of timing and the phase of the position eccentric to the linear guide mechanism 50. The acceleration $\alpha$ is detected by subjecting an acceleration detected by means of the acceleration pickup 151 to acceleration-voltage conversion by the amplifier 152. The eccentricity $e$ can be obtained from the amplitude of the observed acceleration.

In order to obtain the phasic relation between the linear guide mechanism 50 and the eccentric position of the rotating part, the reference mark 28 on the damper 24 is detected by means of the photoreflector sensor 110, and the phase of the eccentric position is detected according to the time when the reference mark 28 passes under the photoreflector sensor 110 and the behavior of vibrational motion of the linear guide mechanism 50 at that time. The oscilloscope 81 or the FFT analyzer 82 is used for the analysis of the behavior of the vibrational motion.

Figure 7:
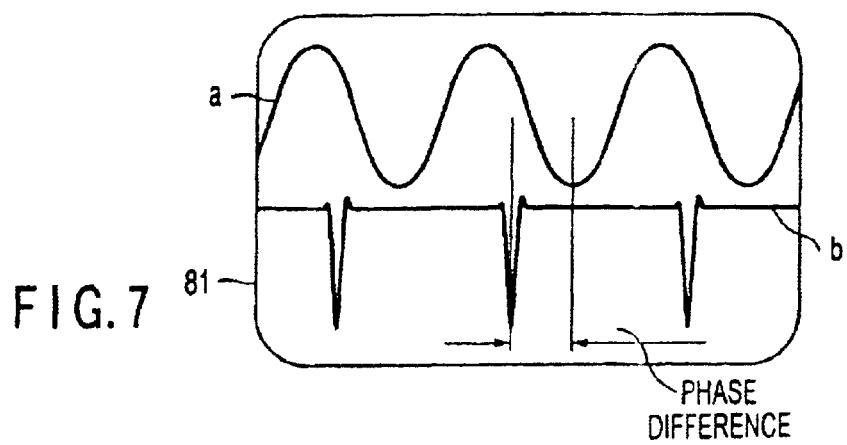
FIG. 7 is an enlarged view of a screen of an oscilloscope of the assembly apparatus.

The following is a description of a case where the behavior of the vibrational motion is detected by means of the acceleration pickup 151 and analyzed by means of the oscilloscope 81. When a line that passes through the eccentric center of the rotating part and the center of rotation is aligned with a moving direction C of the linear guide mechanism 50 and the line passes in front of the acceleration pickup 151, the acceleration of the vibration has its minimum (negative and having a maximum absolute value) and corresponds to the troughs of the cosine (or sine) waveform of the acceleration wave $\underline{a}$ that is displayed on the oscilloscope 81, as shown in FIG. 7. In every cycle of the acceleration wave, the reference mark 28 on the damper 24 never fails to pass once in front of the photoreflector sensor 110. The sensor 110 detects the reference mark 28 and delivers an index signal $\underline{b}$ to the oscilloscope 81.

The phase difference between a trough of the acceleration wave $\underline{a}$ and the index signal $\underline{b}$ indicates the time at which the eccentric center passes in front of the acceleration pickup 151 after the reference mark 28 passes the photoreflector sensor 110. Based on this, the control element 80 detects the phasic relation between the reference mark 28 and the eccentric point.

Let it now be supposed that the damper 24 is unfastened to shift the respective positions of the magnetic disks 14a and 14b with respect to the hub 22, thereby canceling the eccentricity.

In order to obtain the eccentricity $\underline{e}=0$, it is necessary only that adjustable parts (magnetic disk, clamper, and spacer ring) be moved for $e_2$ according to $$e = (m_1 e_1 + m_2 e_2)/m,$$

$$e_2 = 0, \quad (2)$$

where $\underline{m}$ is the mass of the rotating part; $m_1$, the mass of the adjustable parts; $m_2$, the mass of unadjustable parts (motor rotor and hub); $\underline{e}$, the eccentricity of the rotating part; $e_1$, the eccentricity of the adjustable parts; and $e_2$, the eccentricity of the unadjustable parts, based on $m = m_1 + m_2$ (rotating part=adjustable parts+unadjustable parts), and $$e = (m_1/m)e_1,$$

$$e = \alpha_0 M/m\omega^2,$$

$$(m_1/m)e_1 = \alpha_0 M/m\omega^2,$$

$$e_1 = \alpha_0 M/m_1 \omega^2, \quad (3)$$

(every eccentricity is supposed to be caused by a gap attributable to the fitting of assemblies).

The behavior of the vibrational motion may be detected in the form of speed by means of a laser Doppler speedometer, solenoid, or microphone sensor, as well as the acceleration pickup 151. Alternatively, it may be detected in the form of displacement by means of a displacement gauge such as a laser displacement gauge.

In these cases, amplitudes V and X of the speed and displacement are given by $$V = (me\omega/M)\sin(\omega t+\phi),$$

$$X = -(me/M)\cos(\omega t+\phi), \quad (4)$$

respectively.

The following is a description of a correcting method for correcting the eccentricity measured by the measuring method described above. Here let it be supposed that the angle between the reference mark 28 and the eccentric position and the eccentricity $e_1$ to be adjusted are known values obtained by the aforesaid eccentricity measurement.

Figure 8:
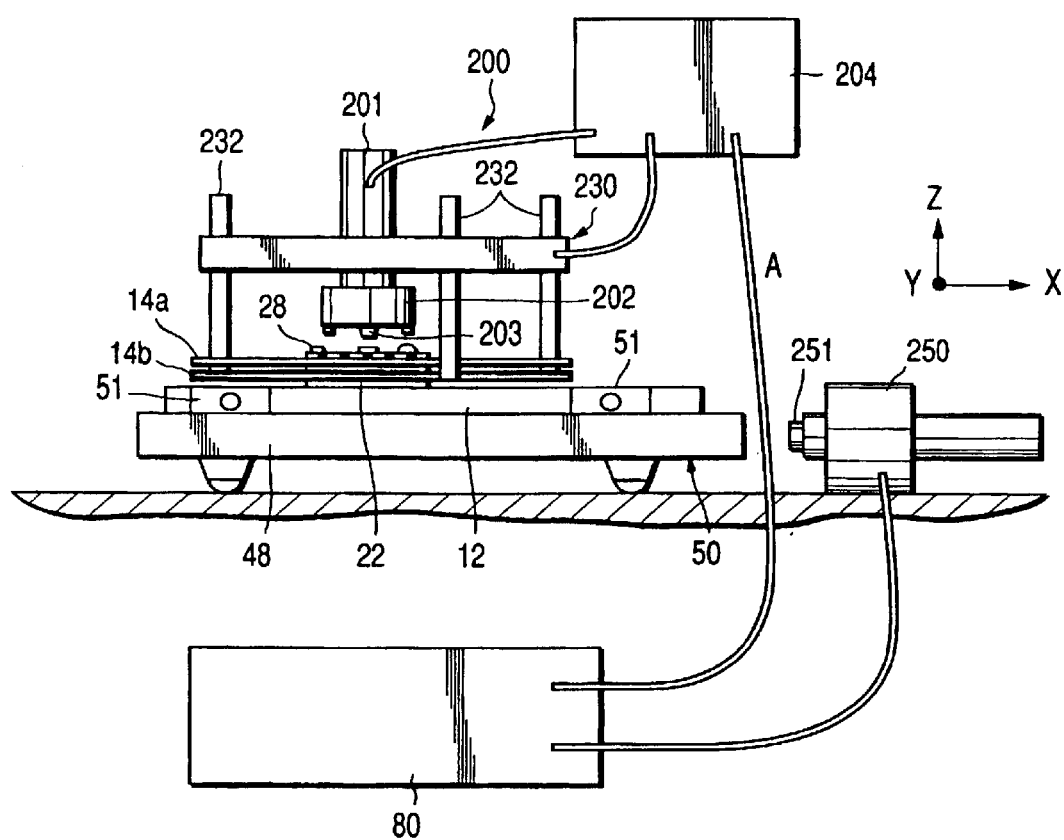
FIG. 8 is a view showing an eccentricity adjusting process using the assembly apparatus.
Figure 9:
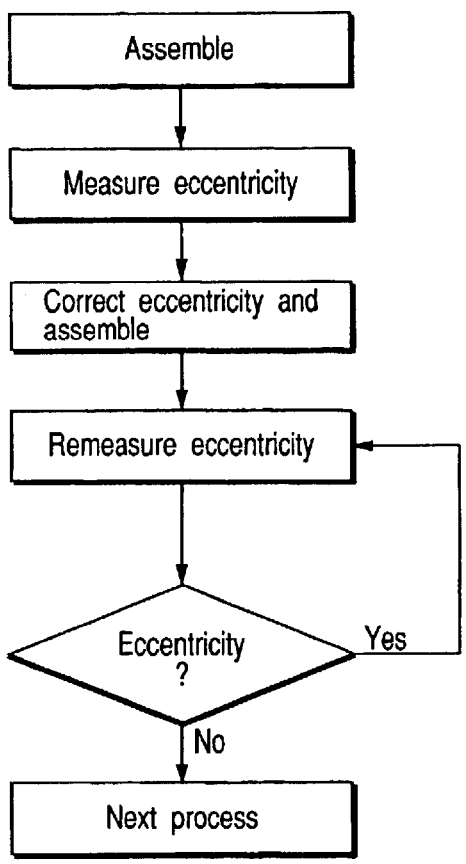
FIG. 9 is a flowchart showing an assembly method according to another embodiment of the invention.

First, as shown in FIG. 8, the rotating part is rocked with reference to the reference mark 28 and the angle between the reference mark and the eccentric position so that the eccentric position is on the opposite side from the feed mechanism 250 on the X-axis in the moving direction C of the stage 48. As this is done, the rotating part is rotated by means of the pin face wrench 202.

After rocking the rotating part is finished, the two magnetic disks 14a and 14b are simultaneously held and fixed on absolute coordinates by means of the holding mechanism 230. The magnetic disks 14a and 14b are unfastened from the hub 22 by arresting the rotation of the damper 24 and loosening the screw 27 by means of the pin face wrench 202. Thereupon, the relative positions of the magnetic disks 14a and 14b and the case body 12 can be changed.

Subsequently, the stage 48 of the linear guide mechanism 50 is pressed and moved by the feed mechanism 250 that is provided with the contact sensor 251. As this is done, the stage 48 is moved for the eccentricity $e_1$ to be adjusted after the contact sensor 251 detects contact with the stage 48. Since the magnetic disks 14a and 14b are unfastened from the hub 22 in the preceding process, the relative positions of the magnetic disks and the case body 12 can be adjusted by moving the stage 48.

By relatively moving the magnetic disks 14a and 14b and the case body 12 for the eccentricity $e_1$ in this manner, the center of gravity of the rotating part and the center of rotation can be made to coincide to cancel out the eccentricity. After the movement of the stage 48 is finished, the screw 27 of the damper 24 is tightened by means of the pin face wrench 202 to fasten the magnetic disks 14a and 14b to the hub 22. Then, the magnetic disks 14a and 14b are released from the hold by the holding mechanism 230. Thereafter, the HDD 10 is removed from the stage 48. Thus, the HDD can be obtained free from eccentricity.

Alternatively, the respective centers of a plurality of magnetic disks may be aligned with one another by simultaneously holding the disks by means of the holding mechanism 230. In consideration of the variation in roundness of the outside diameter of each magnetic disk, moreover, the magnetic disk may be held by rocking the holding mechanism 230 with reference to the reference mark 28 of the clamper 24 so that the holding rods 232 of the holding mechanism hold the magnetic disk on the same spot without fail.

According to the assembly method and the assembly apparatus arranged in this manner, the eccentricity measurement and eccentricity adjustment can be carried out by means of one and the same apparatus, and an eccentricity-free HDD designed so that the center of gravity of the rotating part and the center of rotation are coincident can be assembled with ease.

Figure 10:
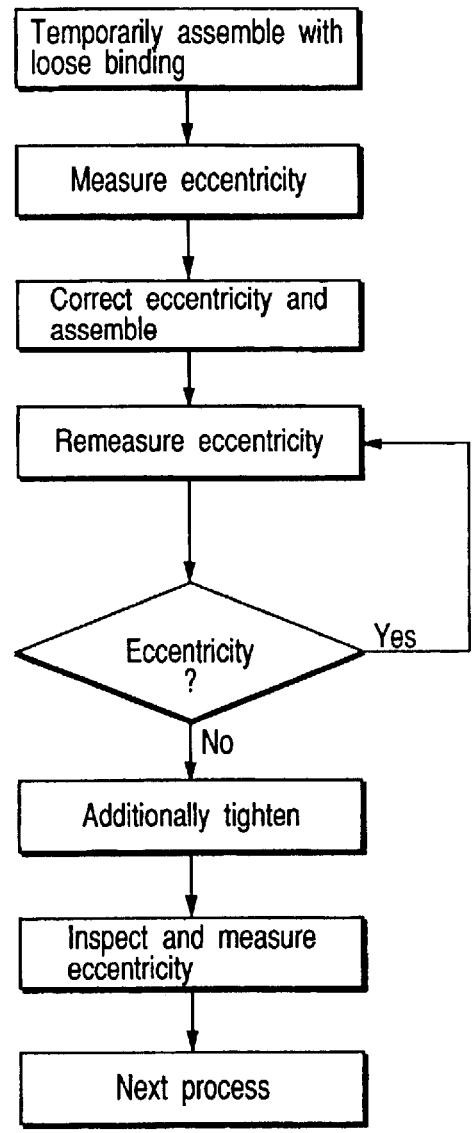
FIG. 10 is a flowchart showing an assembly method according to still another embodiment of the invention.

Since fastening the magnetic disks and the eccentricity measurement can be performed by means of the one apparatus, moreover, the apparatus can also be used as an inspection apparatus if the eccentricity measurement is conducted again after the magnetic disks are fastened. In doing this, as shown in FIG. 10, temporary assembly may be carried out with the clamper loosely bound in the initial stage of assembly. In this case, the eccentricity inspection is conducted again after the damper is additionally tightened if the inspection is passed when the eccentricity measurement is repeated after the first eccentricity measurement and the eccentricity adjustment.

Figure 11:
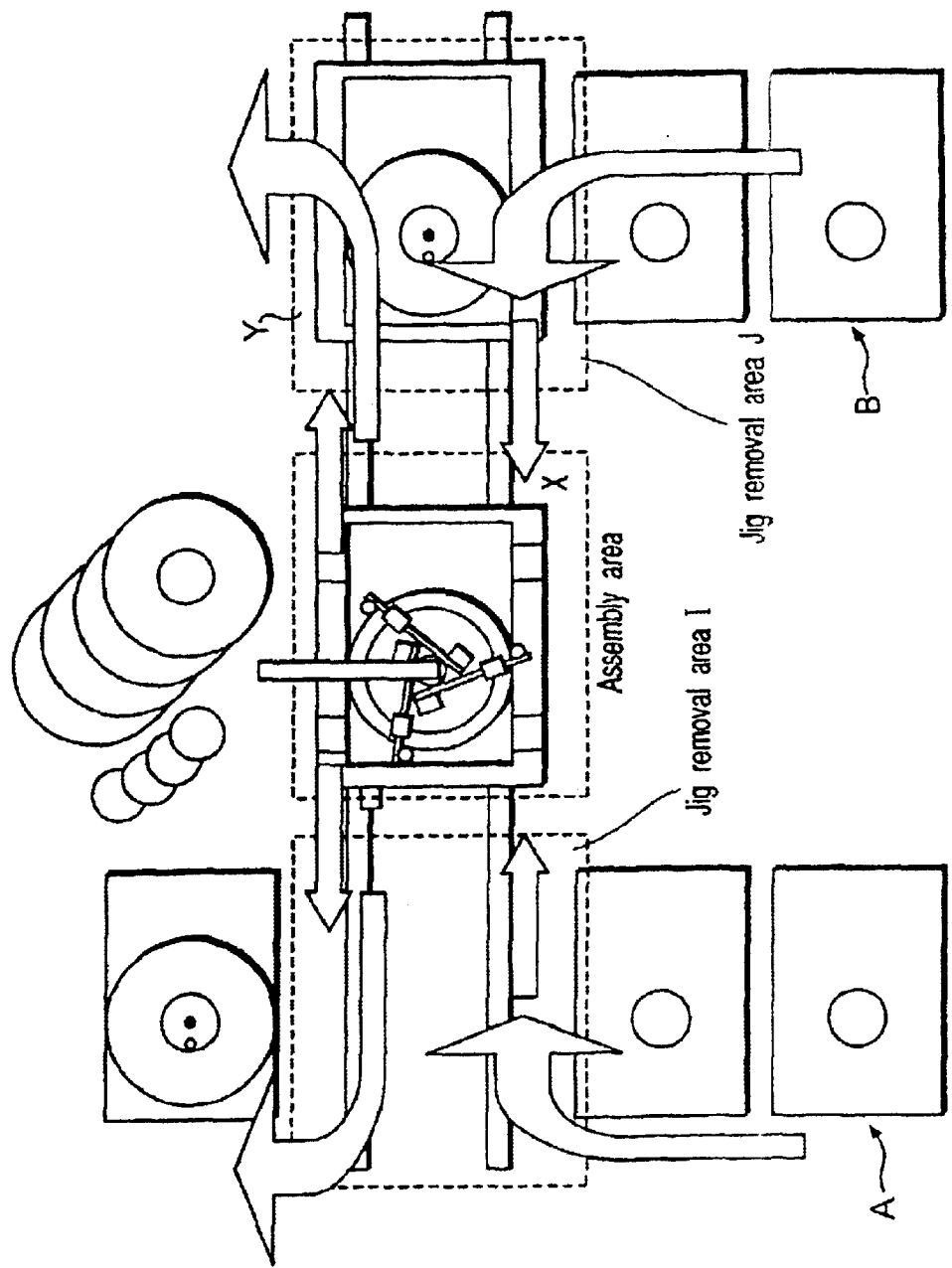
FIG. 11 is a view typically showing a mass-production apparatus to which the assembly apparatus according to the embodiment of the invention is applied.

Since the assembly apparatus described above is provided with the linear guide mechanism, furthermore, it is applicable to an assembly apparatus for mass-production shown in FIG. 11. More specifically, the assembly apparatus comprises first and second lines A and B for supplying HDDs, two stages X and Y that constitute first and second linear guide mechanisms, respectively, an assembly area, and first and second jig removal areas I and J that are situated on the opposite sides of the assembly area, individually.

The assembly area is provided with the measuring mechanism 100 and the relative movement mechanism 200. The stage X, which is provided with fixing jigs, can reciprocate between the assembly area and the first jig removal area I. The stage Y, which is also provided with fixing jigs, can reciprocate between the assembly area and the second jig removal area J. While an HDD is being assembled by means of the one stage in the assembly area, another HDD is mounted on the other stage or the completed HDD is removed in the jig removal area I or J.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the invention is applicable to a disk recording apparatus that is provided with one or three or more disks, as well as to a disk recording apparatus that is provided with two disks.

What is claimed is:

1. A method of assembling a disk recording apparatus, which comprises a base, a spindle motor fixed to the base, a disk mounted on a rotor of the spindle motor, and a damper fastening the disk to the rotor, the method comprising:

driving the spindle motor to rotate a rotating part, including the rotor, disk, and clamper, in a manner such that the disk recording apparatus is supported for movement with one degree of freedom of translation in a direction substantially in parallel to surfaces of the disk;

measuring vibration of the disk recording apparatus in the direction of the one degree of freedom of translation caused by the rotation of the rotating part;

detecting the angular position of the disk at which vibration of a maximum amplitude is generated;

analyzing the eccentricity and the direction of eccentricity of the rotating part in accordance with the measured vibration and the detected angular position; and relatively moving the base and the rotating part to correct the eccentricity in accordance with the result of the analysis.

2. A method of assembling a disk recording apparatus according to claim 1, wherein the rotating part is rotated in accordance with the result of the analysis so that the direction of eccentricity and the direction of the one degree of freedom of translation are coincident, the disk is held to fix the rotating part on absolute coordinates after the rotating part is rotated, the disk is unfastened from the rotor with the rotating part fixed, the base is moved relative to the rotating part in accordance with the eccentricity obtained by the analysis in the direction of the one degree of freedom of translation, thereby making the center of gravity of the rotating part and the center of rotation coincident, after the disk is unfastened, and the disk is fastened to the rotor after the relative movement.

3. A method of assembling a disk recording apparatus according to claim 1, wherein the rotating part is released from fixation, and rotation of the rotating part, measurement of vibration, and analysis of the eccentricity and the direction of eccentricity are repeated after the disk is fastened to the rotor, and the eccentricity is corrected again if the eccentricity is not in conformity with a given reference value.

4. A method of assembling a disk recording apparatus, which comprises a base, a spindle motor fixed to the base, a disk mounted on a rotor of the spindle motor, and a damper fixed to the rotor by means of a screw and fastening the disk to the rotor, the method comprising:

- driving the spindle motor to rotate a rotating part, including the rotor, disk, and clamper, in a manner such that the disk recording apparatus is supported for movement with one degree of freedom of translation in a direction substantially in parallel to surfaces of the disk;
- measuring vibration in the direction of the one degree of freedom of translation caused by the rotation of the rotating part of the disk recording apparatus;
- detecting the angular position of the disk at which vibration of a maximum amplitude is generated;
- analyzing the eccentricity and the direction of eccentricity of the rotating part in accordance with the measured vibration and the detected angular position;
- rotating the rotating part in accordance with the result of the analysis so that the direction of eccentricity and the direction of the one degree of freedom of translation are coincident;
- holding the disk to fix the rotating part on absolute coordinates after the rotating part is rotated;
- loosening the screw of the damper to unfasten the disk from the rotor with the rotating part fixed;
- moving the base relative to the rotating part in accordance with the eccentricity obtained by the analysis in the direction of the one degree of freedom of translation, thereby making the center of gravity of the rotating part and the center of rotation coincident, after the disk is unfastened; and
- tightening the screw of the damper to fasten the disk to the rotor after the relative movement.

* * * * *